United States Patent
Choi

[11] Patent Number: 5,918,968
[45] Date of Patent: Jul. 6, 1999

[54] ILLUMINATING DEVICE FOR PROJECTOR

[75] Inventor: Soon-cheol Choi, Suwon, Rep. of Korea

[73] Assignee: Samsung Electronics Co., Ltd., Kyungki-do, Rep. of Korea

[21] Appl. No.: 08/878,779

[22] Filed: Jun. 19, 1997

[30] Foreign Application Priority Data

Jun. 28, 1996 [KR] Rep. of Korea ........................ 96-25206
Feb. 22, 1997 [KR] Rep. of Korea .......................... 97-5472

[51] Int. Cl.⁶ ...................................................... F21V 13/02
[52] U.S. Cl. ........................... 362/268; 362/309; 362/328; 362/331; 362/335
[58] Field of Search ..................... 362/268, 308, 362/309, 328, 331, 332, 335

[56] References Cited

U.S. PATENT DOCUMENTS

| | | | |
|---|---|---|---|
| 3,325,238 | 6/1967 | Geier | 362/308 X |
| 4,327,972 | 5/1982 | Brunsting | 362/335 |
| 5,307,247 | 4/1994 | Cejnek | 362/309 X |
| 5,662,410 | 9/1997 | Suganuma | 362/331 X |
| 5,808,759 | 9/1998 | Okamori et al. | 362/308 X |

Primary Examiner—Laura Tso
Attorney, Agent, or Firm—Sughrue, Mion, Zinn, Macpeak & Seas, PLLC

[57] ABSTRACT

An illuminating device for a projector, includes: a lamp for emitting light; a parabolic mirror for converting the light emitted from the lamp into parallel light rays by reflecting the light emitted from the lamp; a convex lens for refracting the parallel light rays which have been reflected by the parabolic mirror, and also converting directly input light from the lamp which is not reflected by the parabolic mirror into parallel light rays; and a combination lens composed of a first lens and a second lens. The first lens is for focusing the light refracted by the convex lens at a predetermined focal point and the second lens is for focusing the parallel light rays converted by the convex lens at the focal point. An image lens is also provided for converting the light focused at the focal point into a parallel beam of light rays. Therefore, the efficiency of the use of light of a projector can be improved by adopting such an illuminating device.

8 Claims, 5 Drawing Sheets

ILLUMINATING DEVICE FOR PROJECTOR

BACKGROUND OF THE INVENTION

The present invention relates to an illuminating device and, more particularly, to an illuminating device for a projector which improves the efficiency of the use of light by using light normally not focused by a parabolic mirror.

Referring to FIG. 1, a conventional illuminating device used as a light source of a projector for projecting an image onto a screen, includes a lamp 1 which emits light and a parabolic mirror 2 which reflects and converts the light emitted from the lamp 1 into parallel light rays 3. The parallel light rays 3 reflected from the parabolic mirror 2 pass through a liquid crystal display device (not shown) which forms an image according to electrical signals and then is projected onto a screen (not shown).

In such a projector, since light needed to form an image on a screen among the light emitted from the lamp 1 are the parallel rays 3 which are reflected from the parabolic mirror 2, non-reflected light 4 which is not reflected by the parabolic mirror 2 but radiates outside does not contribute to the formation of the image. Thus, the efficiency is lowered due to the loss of light in the conventional illuminating device for a projector which lacks the means for converting the non-reflected light 4 into a parallel beam of light rays.

SUMMARY OF THE INVENTION

To solve the above problem, it is an object of the present invention to provide an illuminating device for a projector which converts light that is not reflected by a parabolic mirror among the light rays emitted from a light source into parallel light rays, thereby improving the efficiency of light use.

Accordingly, to achieve the above object, there is provided an illuminating device for a projector, including: a lamp for emitting light; a parabolic mirror for converting the light emitted from the lamp into parallel light rays by reflecting the light; a convex lens for refracting the parallel light rays which have been reflected by the parabolic mirror, and also converting directly input light from said lamp which is not reflected by the parabolic mirror into parallel light rays; a combination lens composed of a first lens and a second lens, the first lens for focusing the light refracted by the convex lens at a predetermined focal point and the second lens for focusing the parallel light rays converted by the convex lens at the focal point; and an image lens for converting the light focused at the focal point into a parallel beam of light rays.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
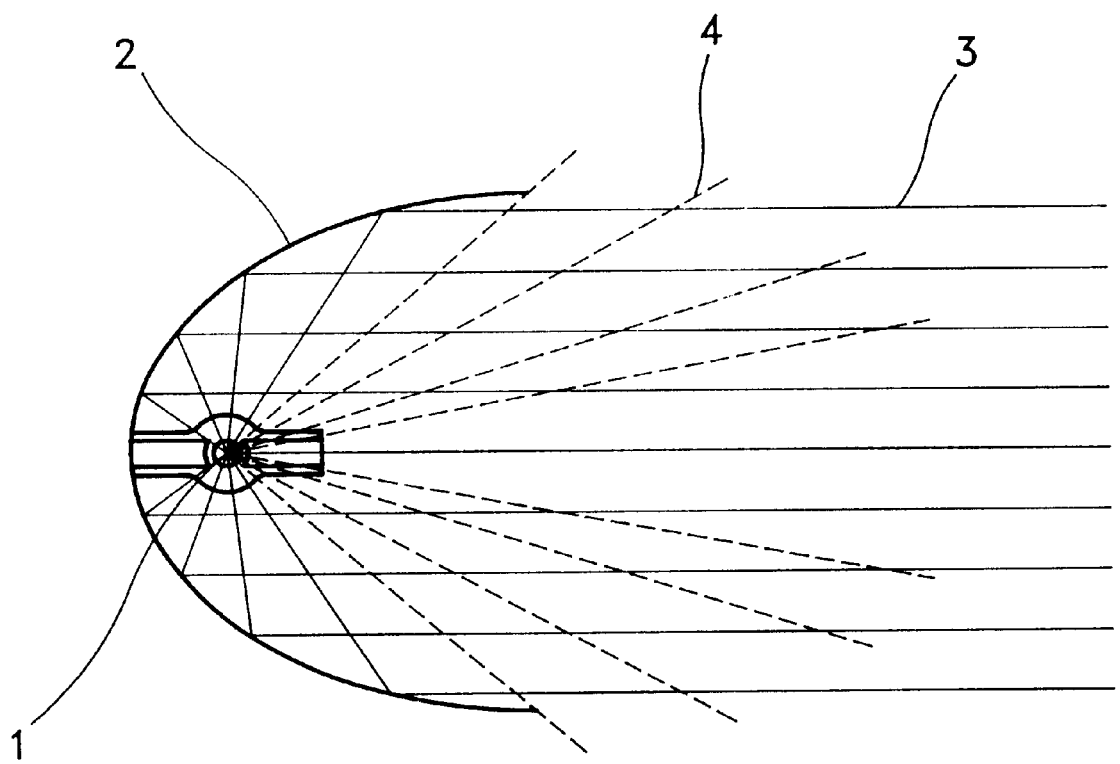
FIG. 1 is a diagram showing a part of a conventional illuminating device for a projector.
Figure 2:
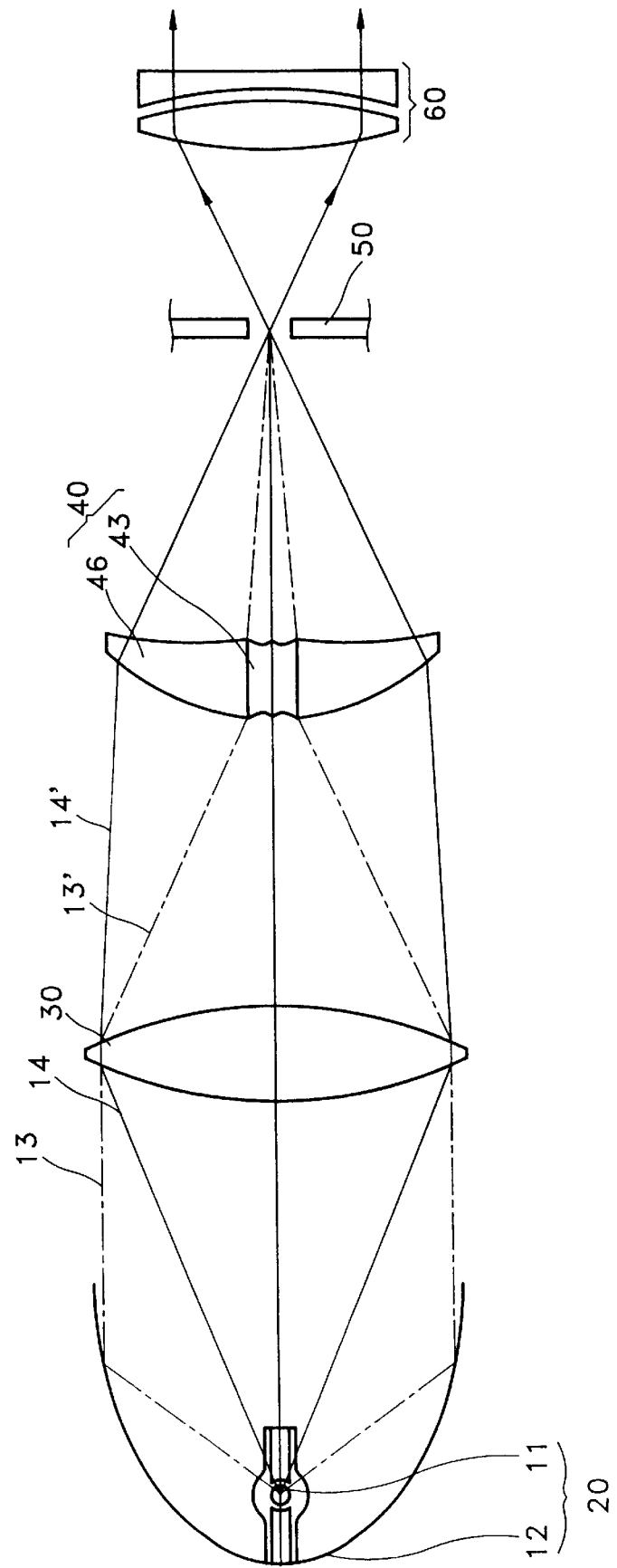
FIG. 2 is a diagram showing the structure of an illuminating device for a projector according to the present invention.

Referring to FIG. 2, in an illuminating device for a projector according to the present invention, a light source unit 20 includes a lamp 11 for emitting light and a parabolic mirror 12 for reflecting the emitted light into a parallel beam. Here, various lamps such as a metal halide lamp or a xenon arc lamp can be employed.

A convex lens 30 is disposed in front of the light source unit 20 and performs two functions: (1) to focus parallel light rays 13 (indicated by the dashed line) reflected from the parabolic mirror 12 by converting the same into refractive light rays 13', and (2) to convert light rays 14 which are directly emitted from the lamp 11 without being reflected by the parabolic mirror 12 into parallel light rays 14' by refracting the same. Preferably, at least one surface of the convex lens 30 is aspherical.

Figure 3:
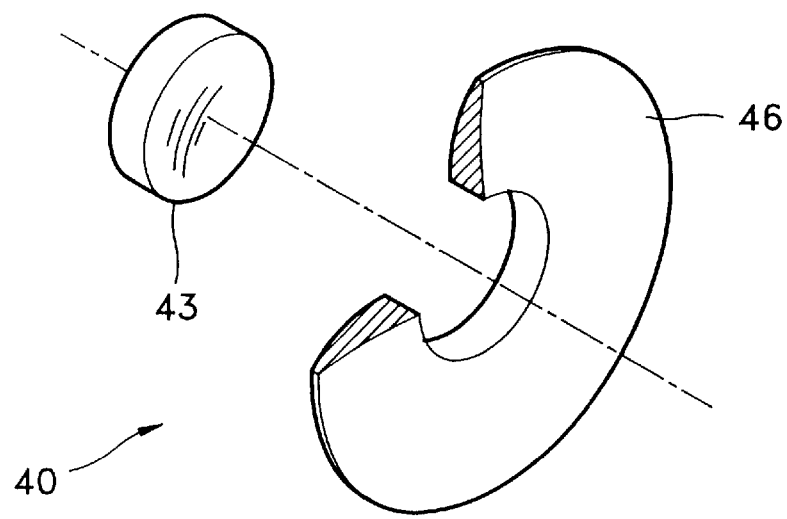
FIG. 3 is an exploded perspective view illustrating a combination lens adopted in the illuminating device shown in FIG. 2.

A combination lens 40 which is disposed in front of the convex lens 30 includes a first lens 43 and a second lens 46. The first lens 43 is disposed at a point where the refractive light rays 13' are focused after passing through the convex lens 30 and the second lens 46 refracts and focuses the parallel light rays 14'. As shown in FIG. 3, the second lens 46 is donut shaped having a hole at the central portion thereof and the first lens 43 fits into the hole of the second lens 46 to thus compose the combination lens 40. In the alternative, the first lens 43 and the second lens 46 can be manufactured integrally.

The first lens 43 is a concave lens which diverges input light and at least one surface of which is aspherical and the second lens 46 is a convex lens which converges input light and at least one surface of which is aspherical. The first and second lenses 43 and 46 are installed coaxially with respect to the optical axis, as shown in FIG. 2, and all light rays passing through the lenses 43 and 46 converge at one point.

Figure 4:
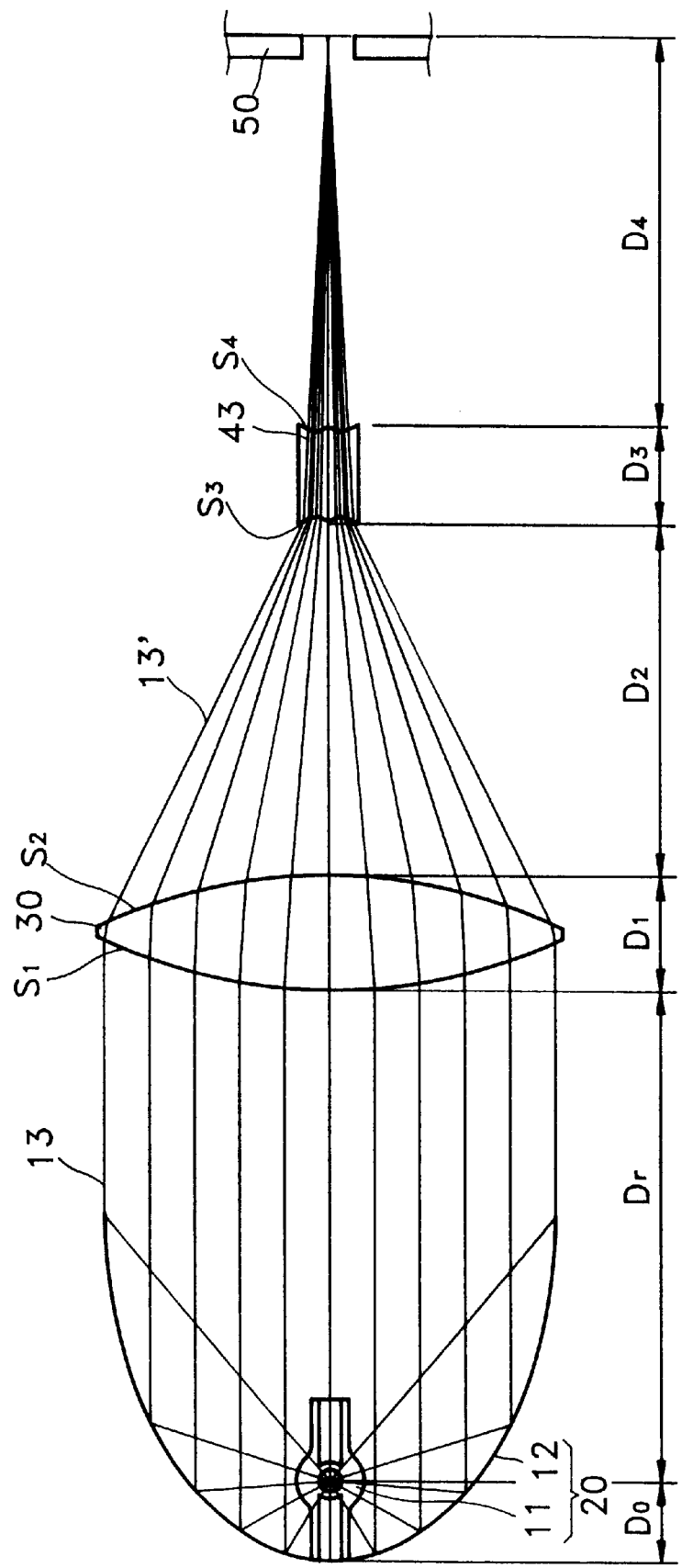
FIG. 4 is a diagram showing the light path of light passing through a first lens in the illuminating device shown in FIG. 2.
Figure 5:
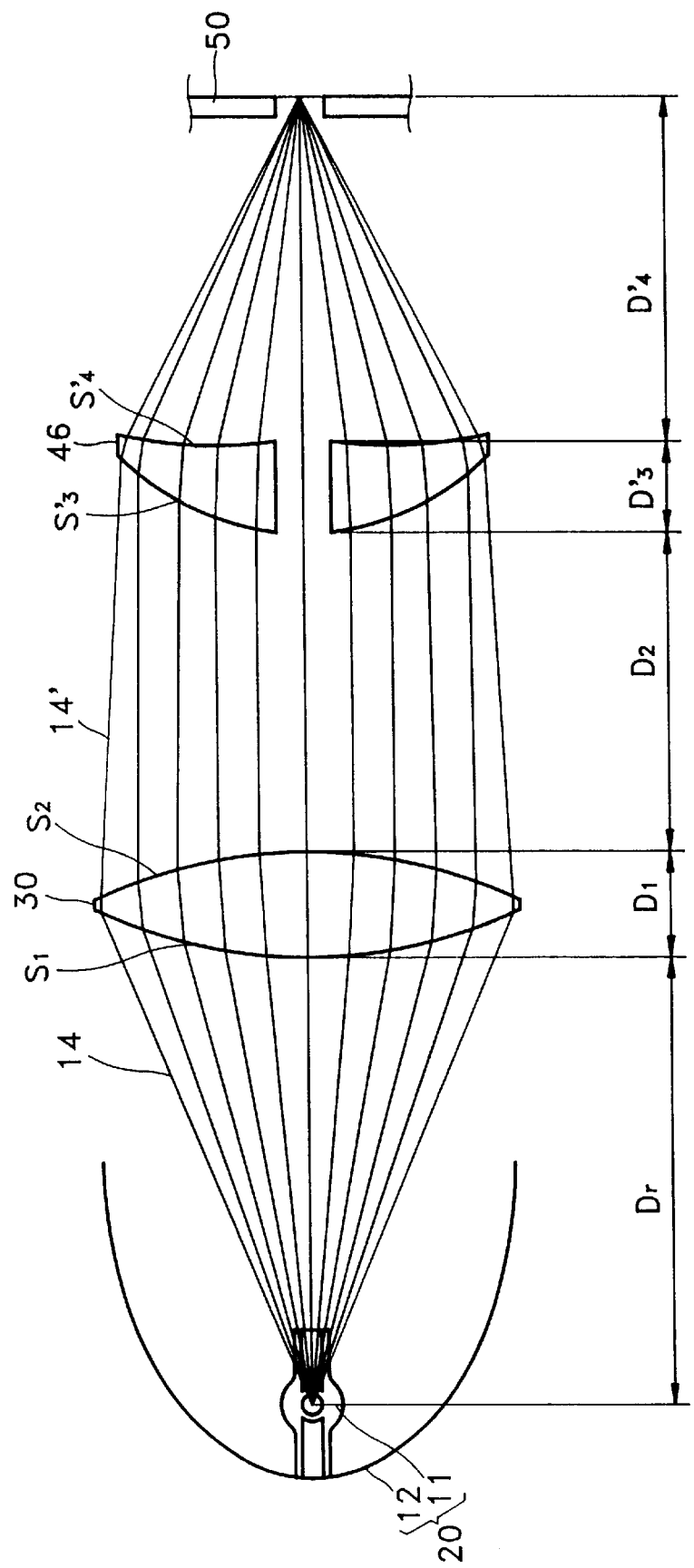
FIG. 5 is a diagram showing the light path of light passing through a second lens in the illuminating device shown in FIG. 2.

FIGS. 4 and 5 are diagrams showing optical systems with respect to the parallel light rays 13 (see FIG. 2) which pass through the first lens 43 and the light rays 14 which pass through the second lens 46, respectively. The most preferable combination of the parabolic mirror 12, the convex lens 30 and the combination lens 40 has been determined through experiments by the present inventor and is shown in the following table with reference to FIGS. 4 and 5.

TABLE

| SURFACE TYPE | RADIUS OF CURVATURE (mm) | DISTANCE (mm) | CONIC CONSTANT | a | b |
|---|---|---|---|---|---|
| MIRROR: ASPHERICAL | Rr = 12.00000 | Dr = 40.000000 | kr = −1.0 | ar = 0.0 | br = 0.0 |
| S1: SPHERICAL | R1 = 46.80695 | D1 = 15.000000 | — | — | — |
| S2: ASPHERICAL | R2 = −40.62276 | D2 = 36.000000 | k2 = −6.688752 | a2 = 0.9952e-6 | b2 = 0.0 |
| S3: ASPHERICAL | R3 = −3.50000 | D3 = 10.000000 | k3 = 0.0 | a3 = 0.4000e-5 | b3 = 0.0 |
| S4: ASPHERICAL | R4 = 1.25670 | D4 = 50.000000 | k4 = −50.252309 | a4 = −0.2726e-4 | b4 = 0.0 |
| S3': ASPHERICAL | R3' = 43.40233 | D3' = =10.00000 | k3' = 1.325190 | a3' = 0.9450e-5 | b3' = −0.1729e-8 |
| S4': ASPHERICAL | R4' = −80.00000 | D4' = 50.000000 | k4' = 0.0 | a4' = 0.1515e-4 | b4' = 0.0 |
| — | — | $D_0$ = −6.000000 | — | — | — |

Figure 6:
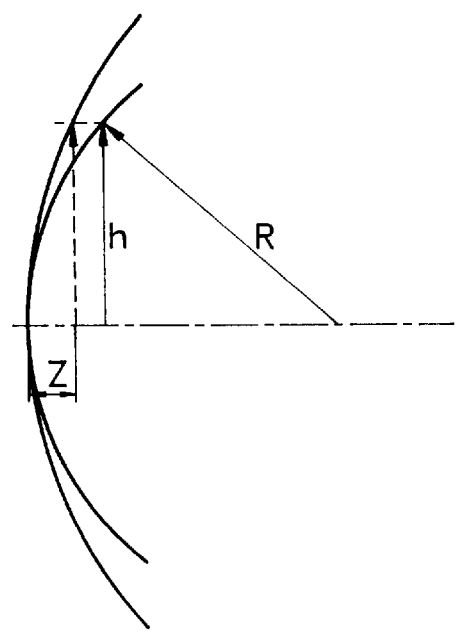
FIG. 6 is a diagram for explaining sag on an aspherical surface.

In this case, S1, S2, S3, S4, S3' and S4' represent the respective surfaces of the convex lens 30, the first lens 43 and the second lens 46 and R1, R2, R3, R4, R3' and R4' represent the radius of curvature of the respective surfaces. Also, $D_0$, Dr, D1, D2, D3 and D4 represent distances between the elements constituting the optical system; k represents the conic constant; a and b represent coefficients. The asphericity is defined according to the following equation.

$$Z = \frac{ch^2}{1 + \sqrt{1 - (1+k)c^2h^2}} + ah^4 + bh^6, \ c$$

where Z represents the sag of an aspherical surface shown in FIG. 6 and h represents the height.

Referring to FIG. 2, in the illuminating device according to the present invention, the light rays 14 which are emitted from the lamp 1 and not reflected from the parabolic mirror 12 are converted into parallel light rays 14' by being refracted by the convex lens 30. The parallel light rays 14' pass through the second lens 46 and are focused at a focal point. Meanwhile, the parallel light rays 13 which are emitted from the lamp 11 and reflected from the parabolic mirror 12 are converted into refractive light rays 13' by being refracted as they pass through the convex lens 30. The refractive light rays 13' are concentrated on the first lens 43 and pass through the first lens 43 and finally are focused at the same focal point as that of the parallel light rays 14' which pass through the second lens 46. That is, the light rays 13' and 14' which have passed through the convex lens 30 are converged into the same focal point after passing through the combination lens 40.

The light rays 13' and 14' converged into the same point pass through a slit 50 and are converted into a parallel beam of light rays by an image lens 60 so as to be projected to a liquid crystal display (not shown).

As described above, the illuminating device for a projector according to the present invention adopts the combination lens which allows the parallel light rays and the refractive light rays both having passed the convex lens to converge at the same focal point. Therefore, since the light which is not reflected from the parabolic mirror can be used, the amount of light to be projected increases, thereby improving the efficiency of light use.

It is contemplated that numerous modifications may be made to the illuminating device for a projector of the present invention without departing from the spirit and scope of the invention as defined in the following claims.

What is claimed is:

1. An illuminating device for a projector, comprising:
a lamp for emitting light;
a parabolic mirror for converting the light emitted from said lamp into parallel light rays by reflecting the light emitted from said lamp;
a convex lens for refracting the parallel light rays which have been reflected by said parabolic mirror, said convex lens also converting directly input light from said lamp which is not reflected by said parabolic mirror into parallel light rays;
a combination lens composed of a first lens and a second lens, said first lens for focusing the light refracted by said convex lens at a predetermined focal point and said second lens for focusing the parallel light rays converted by said convex lens at said focal point; and
an image lens for converting the light focused at said focal point into a parallel beam of light rays.

2. The illuminating device as claimed in claim 1, further comprising a slit through which the light focused at said focal point passes.

3. The illuminating device as claimed in claim 1, wherein at least one surface of said convex lens is aspherical.

4. The illuminating device as claimed in claim 1, wherein said first lens is a concave lens which diverges light as a whole and at least one surface of which is aspherical.

5. The illuminating device as claimed in claim 4, wherein said second lens is a convex lens which converges light as a whole and at least one surface of which is aspherical.

6. The illuminating device as claimed in claim 5, wherein said second lens is donut-shaped having a hole at a central portion thereof, and said first lens fits into said hole so as to combine with said second lens.

7. The illuminating device as claimed in claim 5, wherein said first lens and said second lens are formed integrally.

8. The illuminating device as claimed in claim 1, wherein said second lens is a convex lens which converges light as a whole and at least one surface of which is aspherical.

* * * * *